US012600481B1

(12) United States Patent
Yazici et al.

(10) Patent No.: US 12,600,481 B1
(45) Date of Patent: Apr. 14, 2026

(54) AIRCRAFT AIR SYSTEM WITH BOOST COMPRESSOR(S)

(71) Applicant: RTX Corporation, Farmington, CT (US)

(72) Inventors: Murat Yazici, Glastonbury, CT (US); Thomas E. Clark, Wells, ME (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/048,090

(22) Filed: Feb. 7, 2025

(51) Int. Cl.
*B64D 13/02* (2006.01)
*F02C 6/08* (2006.01)

(52) U.S. Cl.
CPC .............. *B64D 13/02* (2013.01); *F02C 6/08* (2013.01); *F05D 2220/323* (2013.01); *F05D 2260/213* (2013.01)

(58) Field of Classification Search
CPC ..... B64D 13/02; F02C 6/08; F05D 2220/323; F05D 2260/213
See application file for complete search history.

(56) References Cited

U.S. PATENT DOCUMENTS

| | | | |
|---|---|---|---|
| 8,063,501 B2 | 11/2011 | Finney | |
| 10,641,177 B2 * | 5/2020 | Brostmeyer | ............ F02C 7/185 |
| 10,662,960 B2 | 5/2020 | Ricordeau | |
| 11,421,604 B2 | 8/2022 | Woods | |
| 11,473,497 B2 | 10/2022 | Schwarz | |
| 2013/0040545 A1 | 2/2013 | Finney | |
| 2017/0106985 A1 * | 4/2017 | Stieger | ................... B64D 13/02 |
| 2020/0182073 A1 * | 6/2020 | Courtier | ................. B64C 11/26 |
| 2021/0070453 A1 | 3/2021 | Kocherry | |

* cited by examiner

*Primary Examiner* — Steven M Sutherland
(74) *Attorney, Agent, or Firm* — Getz Balich LLC

(57) ABSTRACT
A system is provided for an aircraft. This aircraft system includes a turbine engine and an air system. The turbine engine includes a flowpath, a compressor section, a combustor section and a turbine section. The flowpath extends through the compressor section, the combustor section and the turbine section from an airflow inlet into the flowpath to a combustion products exhaust from the flowpath. The air system includes an air circuit, a first boost compressor, a second boost compressor and a heat exchanger. A circuit inlet into the air circuit is fluidly coupled to the flowpath upstream of the combustor section. The air circuit projects out from the circuit inlet and extends through the first boost compressor, the second boost compressor and the heat exchanger.

16 Claims, 8 Drawing Sheets

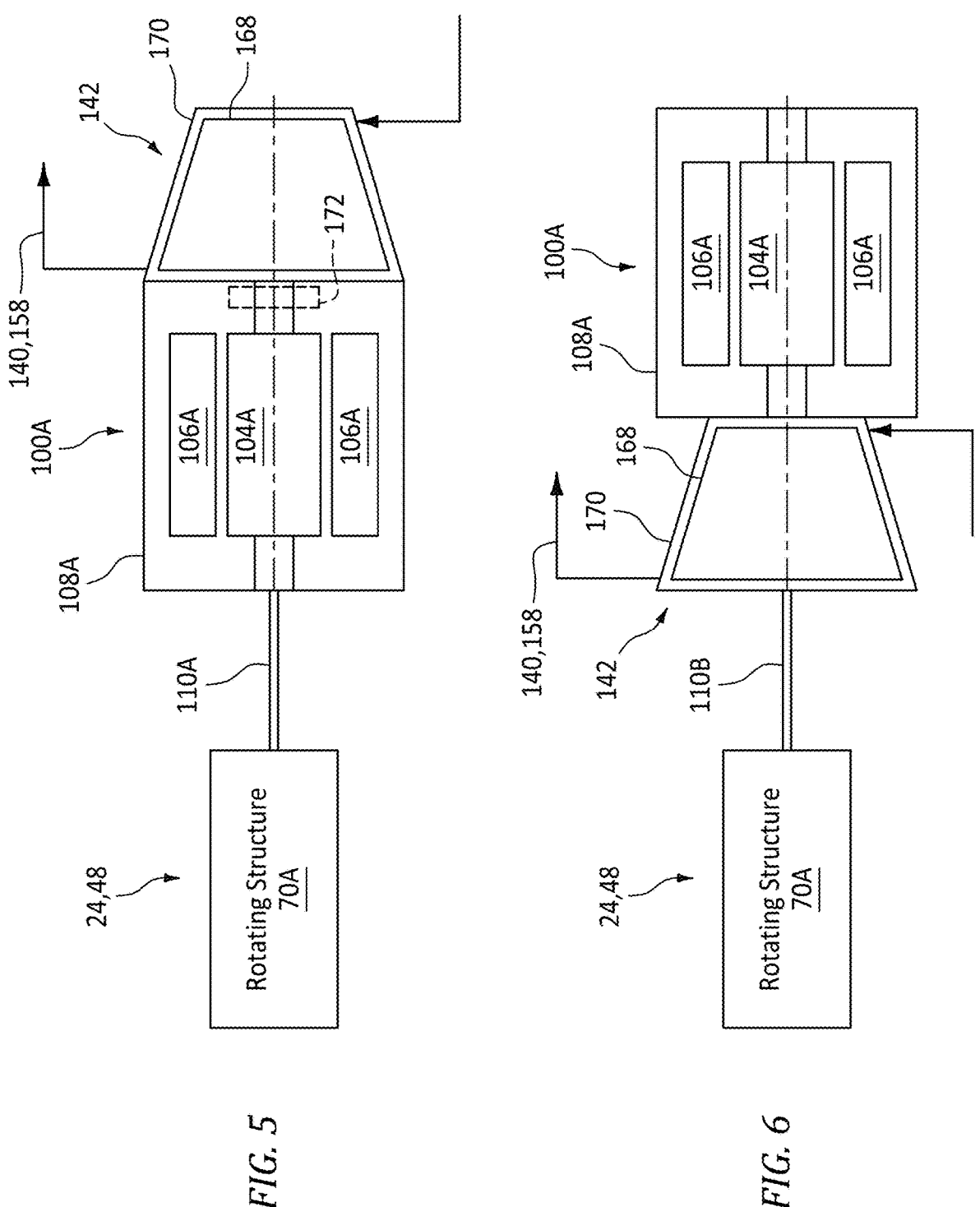

AIRCRAFT AIR SYSTEM WITH BOOST COMPRESSOR(S)

BACKGROUND OF THE DISCLOSURE

1. Technical Field

This disclosure relates generally to an aircraft and, more particularly, to an air system for the aircraft.

2. Background Information

An aircraft and its propulsion system(s) may include various onboard air systems. One such air system provides pressurized air to an environmental control system for the aircraft. Various types and configurations of air systems are known in the art. While these air systems have various benefits, there is still room in the art for improvement.

SUMMARY OF THE DISCLOSURE

According to an aspect of the present disclosure, a system is provided for an aircraft. This aircraft system includes a turbine engine and an air system. The turbine engine includes a flowpath, a compressor section, a combustor section and a turbine section. The flowpath extends through the compressor section, the combustor section and the turbine section from an airflow inlet into the flowpath to a combustion products exhaust from the flowpath. The air system includes an air circuit, a first boost compressor, a second boost compressor and a heat exchanger. A circuit inlet into the air circuit is fluidly coupled to the flowpath upstream of the combustor section. The air circuit projects out from the circuit inlet and extends through the first boost compressor, the second boost compressor and the heat exchanger.

According to another aspect of the present disclosure, another system is provided for an aircraft. This aircraft system includes a turbine engine, an air system and a first electric machine. The turbine engine includes a flowpath, a first rotating structure, a compressor section, a combustor section and a turbine section. The flowpath extends through the compressor section, the combustor section and the turbine section from an airflow inlet into the flowpath to a combustion products exhaust from the flowpath. The first rotating structure includes a first bladed rotor in the compressor section or the turbine section. The air system includes an air circuit, a first boost compressor and a heat exchanger. A circuit inlet into the air circuit is fluidly coupled to the flowpath upstream of the combustor section. The air circuit projects out from the circuit inlet and extends through the first boost compressor and the heat exchanger. The first boost compressor includes a first boost compressor rotor. The first electric machine includes a first electric machine rotor. The first electric machine rotor is operably coupled to and between the first rotating structure and the first boost compressor rotor.

According to still another aspect of the present disclosure, another system is provided for an aircraft. This aircraft system includes a turbine engine, an air system and a first electric machine. The turbine engine includes a flowpath, a first rotating structure, a compressor section, a combustor section and a turbine section. The flowpath extends through the compressor section, the combustor section and the turbine section from an airflow inlet into the flowpath to a combustion products exhaust from the flowpath. The first rotating structure includes a first bladed rotor in the compressor section or the turbine section. The air system includes an air circuit, a first boost compressor and a heat exchanger. A circuit inlet into the air circuit is fluidly coupled to the flowpath upstream of the combustor section. The air circuit projects out from the circuit inlet and extends through the first boost compressor and the heat exchanger. The first boost compressor includes a first boost compressor rotor. The first electric machine includes a first electric machine rotor. The first boost compressor rotor is operably coupled to and between the first rotating structure and the first electric machine rotor.

The first electric machine may be configured to boost mechanical power to the first rotating structure, through the first boost compressor rotor, during a motor mode of operation. The first rotating structure may be configured to mechanically drive rotation of the first electric machine rotor, through the first boost compressor rotor, during a generator mode of operation.

The system may also include a clutch mechanically coupling the first electric machine rotor to the first boost compressor rotor.

The first electric machine may be configurable as: an electric motor during a motor mode of operation; and/or an electric generator during a generator mode of operation.

The system may also include an environmental control system for the aircraft. The air circuit may extend from the circuit inlet to an airflow inlet into the environmental control system.

The first boost compressor and the second boost compressor may be mechanically powered by the turbine engine.

The first boost compressor may include a first boost compressor rotor. The second boost compressor may include a second boost compressor rotor. The turbine engine may also include a first rotating structure and a second rotating structure. The first rotating structure may include a first bladed rotor in the compressor section or the turbine section. The first rotating structure may be mechanically coupled to and configured to drive rotation of the first boost compressor rotor. The second rotating structure may be rotationally independent of the first rotating structure. The second rotating structure may include a second bladed rotor in the compressor section or the turbine section. The second rotating structure may be mechanically coupled to and configured to drive rotation of the second boost compressor rotor.

The system may also include an electric machine, and the electric machine may include an electric machine rotor. The first boost compressor may include a first boost compressor rotor. The second boost compressor may include a second boost compressor rotor. The turbine engine may also include a rotating structure. The rotating structure may include a bladed rotor in the compressor section or the turbine section. The rotating structure may be mechanically coupled to and configured to drive rotation of one of the first boost compressor rotor or the second boost compressor rotor. The electric machine rotor may be mechanically coupled to and configured to drive rotation of the other one of the first boost compressor rotor or the second boost compressor rotor.

The system may also include a first electric machine and/or a second electric machine. The first electric machine may include a first electric machine rotor. The first boost compressor may include a first boost compressor rotor. The first electric machine rotor may be mechanically coupled to and configured to drive rotation of the first boost compressor rotor. The second electric machine may include a second electric machine rotor. The second boost compressor may include a second boost compressor rotor. The second electric machine rotor may be mechanically coupled to and configured to drive rotation of the second boost compressor rotor.

The system may also include an electric machine, and the electric machine may include an electric machine rotor. The turbine engine may also include a rotating structure. The rotating structure may include a bladed rotor in the compressor section or the turbine section. The first boost compressor may include a first boost compressor rotor. The second boost compressor may include a second boost compressor rotor. The electric machine rotor may be mechanically coupled between the rotating structure and one of the first boost compressor rotor or the second boost compressor rotor.

The system may also include a clutch mechanically coupling the rotating structure to the one of the first boost compressor rotor or the second boost compressor rotor.

The system may also include a first electric machine and/or a second electric machine. The first electric machine may include a first electric machine rotor. The second electric machine may include a second electric machine rotor. The turbine engine may also include a first rotating structure and a second rotating structure. The first rotating structure may include a first bladed rotor in the compressor section or the turbine section. The second rotating structure may be rotationally independent of the first rotating structure. The second rotating structure may include a second bladed rotor in the compressor section or the turbine section. The first boost compressor may include a first boost compressor rotor. The first electric machine rotor may be mechanically coupled between the rotating structure and the first boost compressor rotor. The second boost compressor may include a second boost compressor rotor. The second electric machine rotor may be mechanically coupled between the rotating structure and the second boost compressor rotor.

The system may also include an electric machine, and the electric machine may also include an electric machine rotor. The turbine engine may also include a rotating structure. The rotating structure may include a bladed rotor in the compressor section or the turbine section. The first boost compressor may include a first boost compressor rotor. The second boost compressor may include a second boost compressor rotor. One of the first boost compressor rotor or the second boost compressor rotor may be mechanically coupled between the rotating structure and the electric machine rotor.

The system may also include a first electric machine and/or a second electric machine. The first electric machine may include a first electric machine rotor. The second electric machine may include a second electric machine rotor. The turbine engine may also include a first rotating structure and a second rotating structure. The first rotating structure include a first bladed rotor in the compressor section or the turbine section. The second rotating structure may be rotationally independent of the first rotating structure. The second rotating structure may include a second bladed rotor in the compressor section or the turbine section. The first boost compressor may include a first boost compressor rotor. The first boost compressor rotor may be mechanically coupled between the first rotating structure and the first electric machine rotor. The second boost compressor may include a second boost compressor rotor. The second boost compressor rotor may be mechanically coupled between the second rotating structure and the second electric machine rotor.

The air system further may include a valve fluidly coupled inline along the air circuit between the circuit inlet and the first boost compressor.

The air circuit may include a first circuit leg, a second circuit leg and a plurality of parallel circuit legs. The first circuit leg may extend through the first boost compressor. The second circuit leg may extend through the heat exchanger. The parallel circuit legs may be disposed between and fluidly coupled with the first circuit leg and the second circuit leg. A first of the parallel circuit legs may extend through the second boost compressor. A second of the parallel circuit legs may bypass the second boost compressor.

The air circuit may also include a valve configured to: fluidly couple the first circuit leg to the first of the plurality of parallel circuit legs during a first mode; and/or fluidly couple the second circuit leg to the second of the plurality of parallel circuit legs during a second mode.

The valve may also be configured to: fluidly decouple the first circuit leg from the second of the plurality of parallel circuit legs during the first mode; and/or fluidly decouple the first circuit leg from the first of the plurality of parallel circuit legs during the second mode.

The air system may also include a valve fluidly coupled inline along the air circuit between the second boost compressor and the heat exchanger.

The turbine engine may also include a first rotating structure and a second rotating structure that is rotationally independent of the first rotating structure. The first rotating structure may include a first compressor rotor in the compressor section. The second rotating structure may include a second compressor rotor in the compressor section. The second compressor rotor may be disposed between the first compressor rotor and a combustor in the combustor section. The circuit inlet may be fluidly coupled to the flowpath downstream of the first compressor rotor.

The circuit inlet may be fluidly coupled to the flowpath along the second compressor rotor.

The system may also include a ducted propulsor rotor. The turbine engine may be configured to drive rotation of the ducted propulsor rotor.

The system may also include an open propulsor rotor. The turbine engine may be configured to drive rotation of the open propulsor rotor.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIGS. 5 and 6 are schematic illustrations of a portion of the aircraft propulsion system with various upstream boost compressor arrangements.

DETAILED DESCRIPTION

Figure 1:
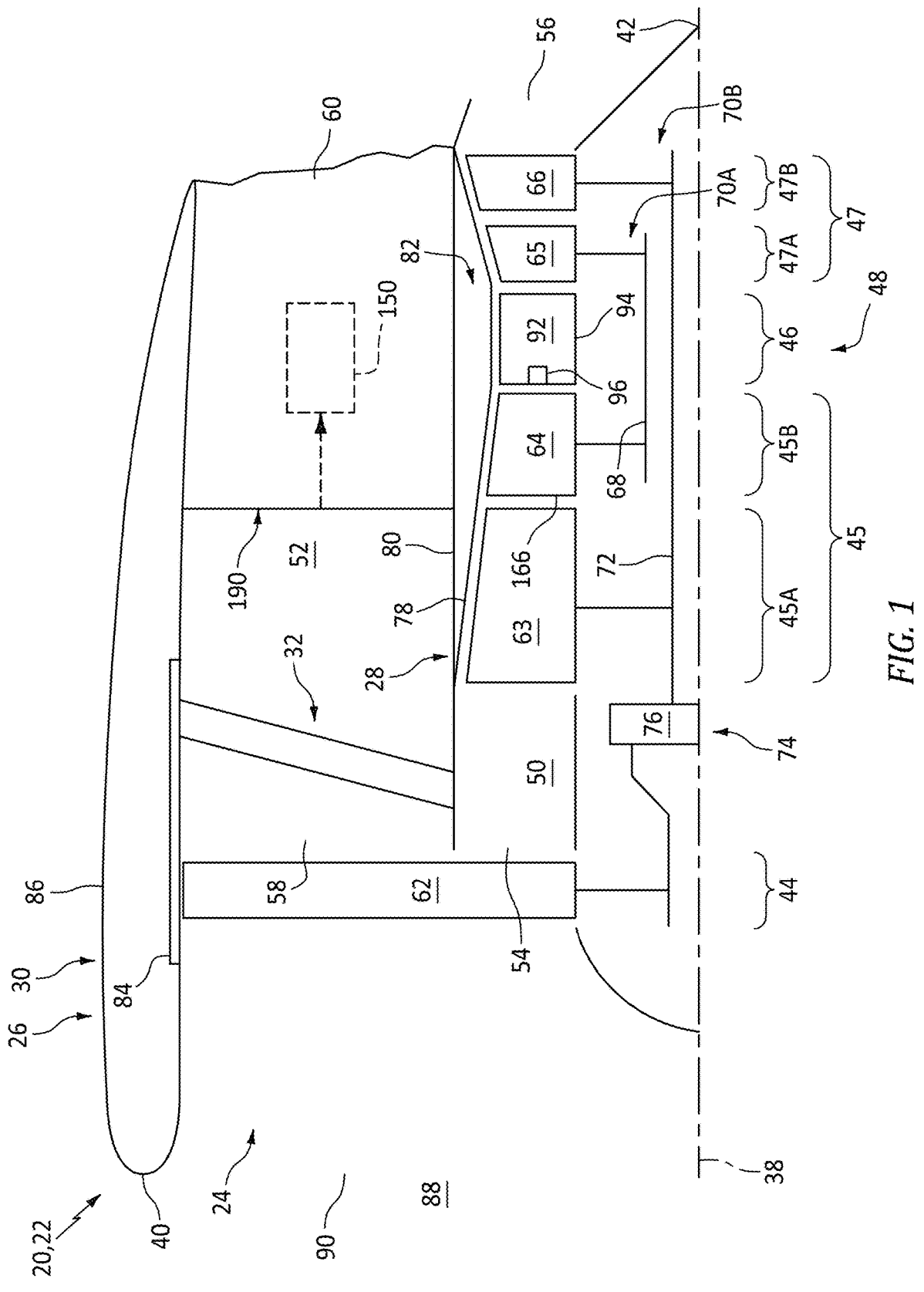
FIG. 1 is a partial schematic illustration of an aircraft propulsion system with a ducted propulsor rotor.

FIG. 1 illustrates a powerplant 20 for an aircraft. The aircraft may be an airplane, a drone (e.g., an unmanned aerial vehicle (UAV)) or any other manned or unmanned aerial vehicle or system. For case of description, the aircraft powerplant 20 is described below as a propulsion system 22 for the aircraft and, more particularly, as a turbofan propulsion system. The aircraft powerplant 20 of the present disclosure, however, is not limited to such an exemplary propulsion system. The aircraft propulsion system 22, for example, may alternatively be configured as a turbojet propulsion system, a turboprop propulsion system, a turboshaft propulsion system, a propfan propulsion system, a pusher fan propulsion system, or any other type of ducted and/or open rotor propulsion system. Moreover, the aircraft powerplant 20 is not limited to propulsion system applications. The aircraft powerplant 20, for example, may also (or alternatively) be configured as an electrical power system for the aircraft; e.g., an auxiliary power unit (APU).

The aircraft propulsion system 22 includes a gas turbine engine 24 (e.g., a turbofan engine) housed within a stationary housing structure 26, which housing structure 26 of FIG. 1 includes an inner housing structure 28, an outer housing structure 30 and a guide vane structure 32 (e.g., a fan exit guide vane (FEGV) structure) extending radially between and connected to the inner housing structure 28 and the outer housing structure 30. The aircraft propulsion system 22 also includes an electric machine system 34 (see FIG. 2) and an air system 36 (see FIGS. 3 and 4). The aircraft propulsion system 22 extends axially along an axis 38 between an axial upstream, forward end 40 of the aircraft propulsion system 22 and an axial downstream, aft end 42 of the aircraft propulsion system 22. Briefly, the propulsion system axis 38 may be a centerline axis of the aircraft propulsion system 22, the turbine engine 24 and/or one or more of its members. The propulsion system axis 38 may also or alternatively be a rotational axis for one or more members of the turbine engine 24.

The aircraft propulsion system 22 and its turbine engine 24 of FIG. 1 include a propulsor section 44 (e.g., a fan section), a compressor section 45, a combustor section 46 and a turbine section 47. The compressor section 45 of FIG. 1 includes a low pressure compressor (LPC) section 45A and a high pressure compressor (HPC) section 45B. The turbine section 47 of FIG. 1 includes a high pressure turbine (HPT) section 47A and a low pressure turbine (LPT) section 47B. At least (or only) the LPC section 45A, the HPC section 45B, the combustor section 46, the HPT section 47A and the LPT section 47B collectively form a core 48 (e.g., a gas generator) of the turbine engine 24. The aircraft propulsion system 22 and its turbine engine 24 of FIG. 1 also include a core flowpath 50 (e.g., an annular core flowpath) and a bypass flowpath 52 (e.g., an annular bypass flowpath). The core flowpath 50 extends sequentially through the LPC section 45A, the HPC section 45B, the combustor section 46, the HPT section 47A and the LPT section 47B from an airflow inlet 54 into the core flowpath 50 to a combustion products exhaust 56 out from the core flowpath 50. The bypass flowpath 52 extends through a bypass duct from an airflow inlet 58 into the bypass flowpath 52 to an airflow exhaust 60 from the bypass flowpath 52, where the bypass duct may be formed by the inner housing structure 28 and the outer housing structure 30. The bypass flowpath 52 and its bypass duct are configured to bypass (e.g., are disposed radially outboard of and extend along) the engine core 48 and the inner housing structure 28.

The propulsor section 44, the LPC section 45A, the HPC section 45B, the combustor section 46, the HPT section 47A and the LPT section 47B may be arranged sequentially along the propulsion system axis 38 within the housing structure 26. The propulsor section 44 includes a bladed propulsor rotor 62; e.g., a fan rotor. The LPC section 45A includes a bladed low pressure compressor (LPC) rotor 63. The HPC section 45B includes a bladed high pressure compressor (HPC) rotor 64. The HPT section 47A includes a bladed high pressure turbine (HPT) rotor 65. The LPT section 47B includes a bladed low pressure turbine (LPT) rotor 66. Each of these engine rotors 62-66 includes a rotor base (e.g., a disk or a hub) and a plurality of rotor blades (e.g., airfoils, vanes, etc.). The rotor blades may be arranged into one or more stages axially along the respective engine rotor 62-66. The rotor blades in each stage are arranged and may be equispaced circumferentially around the respective rotor base in an annular array. Each of the rotor blades is connected to the respective rotor base. The rotor blades, for example, may be formed integral with or mechanically fastened, welded, brazed and/or otherwise attached to the respective rotor base. Each of the rotor blades projects spanwise (e.g., radially) out from the respective rotor base to a distal tip of the respective rotor blade.

The HPC rotor 64 is coupled to and rotatable with the HPT rotor 65. The HPC rotor 64 of FIG. 1, for example, is connected to the HPT rotor 65 through a high speed shaft 68. At least (or only) the HPC rotor 64, the HPT rotor 65 and the high speed shaft 68 collectively form a high speed rotating structure 70A; e.g., a high speed spool of the turbine engine 24 and its engine core 48. This high speed rotating structure 70A of FIG. 1 and its members 64, 65 and 68 are rotatable about the propulsion system axis 38. However, it is contemplated the high speed rotating structure 70A may alternatively be rotatable about another axis radially and/or angularly offset from the rotational axis of the propulsor rotor 62 and/or the centerline axis of the turbine engine 24.

The LPC rotor 63 is coupled to and rotatable with the LPT rotor 66. The LPC rotor 63 of FIG. 1, for example, is connected to the LPT rotor 66 through a low speed shaft 72. At least (or only) the LPC rotor 63, the LPT rotor 66 and the low speed shaft 72 collectively form a low speed rotating structure 70B; e.g., a low speed spool of the turbine engine 24 and its engine core 48. This low speed rotating structure 70B of FIG. 1 and its members 63, 66 and 72 are rotatable about the propulsion system axis 38. However, it is contemplated the low speed rotating structure 70B may alternatively be rotatable about another axis radially and/or angularly offset from the rotational axis of the propulsor rotor 62 and/or the centerline axis of the turbine engine 24.

The low speed rotating structure 70B is coupled to the propulsor rotor 62 through a drivetrain 74. The drivetrain 74 may be configured as a geared drivetrain, where a geartrain 76 (e.g., a transmission, a speed change device, an epicyclic geartrain, etc.) is disposed between and operatively couples the propulsor rotor 62 to the low speed rotating structure 70B and its LPT rotor 66. With this arrangement, the propulsor rotor 62 may rotate at a different (e.g., slower) rotational speed than the low speed rotating structure 70B and its LPT rotor 66. Here, the propulsor rotor 62 and the low speed rotating structure 70B may rotate in a common (the same) direction about the propulsion system axis 38 or in opposite directions about the propulsion system axis 38 depending, for example, upon the specific configuration of the geartrain 76. Alternatively, the drivetrain 74 may be configured as a direct-drive drivetrain, where the geartrain 76 is omitted. With such an arrangement, the propulsor rotor 62 rotates at a common (the same) rotational speed as the low speed rotating structure 70B and its LPT rotor 66.

The inner housing structure 28 of FIG. 1 includes an inner case 78 (e.g., a core case) for the turbine engine 24, an inner nacelle structure 80 (sometimes referred to as an inner fixed structure (IFS)) and an internal inner housing compartment 82 (e.g., an engine core compartment). The inner case 78 is disposed radially outboard of, extends axially along and may circumscribe one or more or all of the engine sections 45A-47B and the engine rotors 63-66. The inner case 78 may thereby house and provide a support structure for the respective engine sections 45A-47B and the engine rotors 63-66. The inner nacelle structure 80 is configured to provide an aerodynamic cover over the engine core 48 and its inner case 78. The inner housing compartment 82 of FIG. 1 is formed by and is disposed radially between the inner case 78 and an inner barrel of the inner nacelle structure 80. The inner housing structure 28 and its inner nacelle structure 80 may also form a radial inner peripheral boundary of the bypass flowpath 52.

The outer housing structure 30 of FIG. 1 includes an outer case 84 (e.g., a fan case) for the turbine engine 24 and an outer nacelle structure 86. The outer case 84 is disposed radially outboard of, extends axially along and may circumscribe the propulsor section 44 and its propulsor rotor 62. The outer case 84 may thereby house and may be configured as a containment structure for the propulsor section 44 and its propulsor rotor 62. The outer nacelle structure 86 is configured to provide an aerodynamic cover over the outer case 84. The outer housing structure 30 and its outer nacelle structure 86 may also form a radial outer peripheral boundary of the bypass flowpath 52.

During operation of the aircraft propulsion system 22 of FIG. 1, ambient air from an environment 88 external to the aircraft and its aircraft propulsion system 22 enters the aircraft propulsion system 22 and its turbine engine 24 through an airflow inlet 90. This air is propelled by the rotating propulsor rotor 62 in a downstream, aft direction towards the propulsion system aft end 42.

An outer stream of the air propelled by the rotating propulsor rotor 62 is directed into the bypass flowpath 52 through its bypass inlet 58, which air entering the bypass flowpath 52 may be referred to as "bypass air". The guide vane structure 32 conditions (e.g., straightens out, de-swirls, etc.) the flow of the bypass air within the bypass duct. This conditioned bypass air is subsequently directed out of the aircraft propulsion system 22 through the bypass exhaust 60 to provide forward thrust. The propulsion of the bypass air may account for a majority of the forward thrust generated by the aircraft propulsion system 22 and its turbine engine 24 of FIG. 1.

An inner stream of the air propelled by the rotating propulsor rotor 62 is directed into the core flowpath 50 through its core inlet 54, which air entering the core flowpath 50 may be referred to as "core air". This core air is compressed by the LPC rotor 63 and the HPC rotor 64 and is directed into a combustion chamber 92 (e.g., annular combustion chamber) of a combustor 94 (e.g., annular combustor) in the combustor section 46. Fuel is injected into the combustion chamber 92 by one or more fuel injectors 96 and mixed with the compressed core air to provide a fuel-air mixture. This fuel-air mixture is ignited and combustion products thereof flow through and sequentially drive rotation of the HPT rotor 65 and the LPT rotor 66. The rotation of the HPT rotor 65 and the LPT rotor 66 respectively drive rotation of the HPC rotor 64 and the LPC rotor 63 and, thus, compression of the air received from the core inlet 54. The rotation of the LPT rotor 66 also drives rotation of the propulsor rotor 62 through the drivetrain 74.

Figure 2:
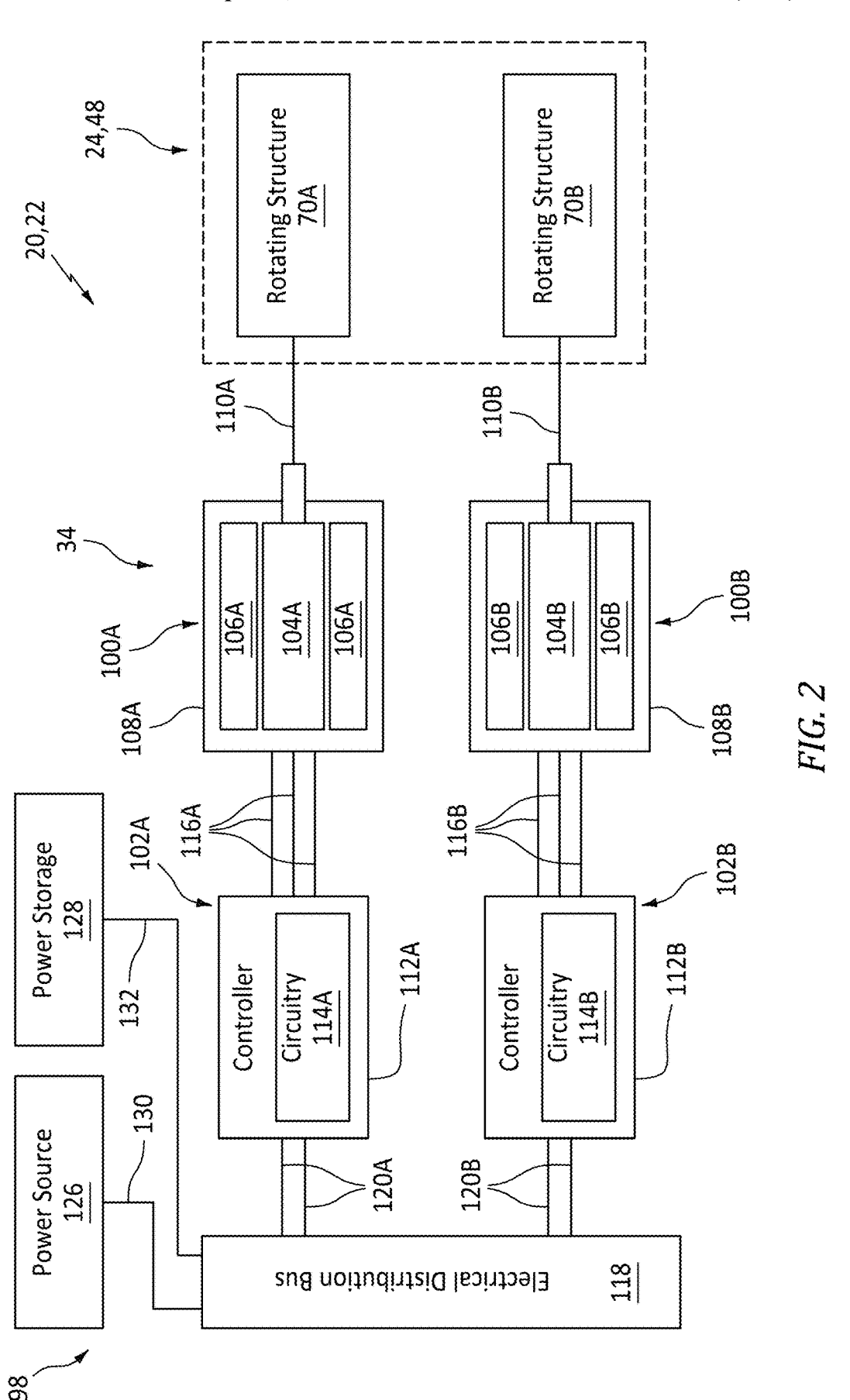
FIG. 2 is a schematic illustration of a portion of the aircraft propulsion system with an electric machine system.

Referring to FIG. 2, the electric machine system 34 is electrically coupled to an electrical system 98 for the aircraft and its aircraft propulsion system 22. The electric machine system 34 of FIG. 2 includes one or more electric machines 100A and 100B (generally referred to as "100") and one or more electric machine (EM) controllers 102A and 102B (generally referred to as "102"). For ease of description, each electric machine 100 of FIG. 2 is described below as being electrically coupled to, controlled by and/or otherwise associated with a single, dedicated one of the EM controllers 102. However, it is contemplated a single EM controller may alternatively be electrically coupled to, may control and/or may otherwise be associated with multiple electric machines. It is also contemplated multiple EM controllers may be electrically coupled to, may control and/or may otherwise be associated with one or more common electric machines.

Each electric machine 100A, 100B of FIG. 2 includes an electric machine rotor 104A, 104B (generally referred to as "104"), an electric machine stator 106A, 106B (generally referred to as "106") and an electric machine housing 108A, 108B (generally referred to as "108"); e.g., a case. The machine rotor 104 is rotatable about a rotational axis of the machine rotor 104, which rotational axis may also be an axial centerline of the electric machine 100. The machine stator 106 of FIG. 2 is radially outboard of and circumscribes the machine rotor 104. With this arrangement, each electric machine 100 is configured as a radial flux electric machine. The electric machines 100 of the present disclosure, however, are not limited to such an exemplary rotor-stator configuration nor to radial flux arrangements. The machine rotor 104, for example, may alternatively be radially outboard of and circumscribe the machine stator 106. In another example, the machine rotor 104 may be axially next to the machine stator 106 configuring the respective electric machine 100 as an axial flux electric machine. Referring again to FIG. 2, the machine rotor 104 and the machine stator 106 are at least partially or completely housed within an interior of the machine housing 108.

Each electric machine 100A, 100B may be operatively coupled to a respective one of the engine rotating structures 70A, 70B (generally referred to as "70"). Each machine rotor 104 of FIG. 2, for example, is mechanically coupled to and rotatable with the respective engine rotating structure 70A, 70B at least or only through a drivetrain 110A, 110B (generally referred to as "110"). This drivetrain 110 may be configured as or otherwise include a shaft, a tower shaft assembly, an accessory gearbox, an angle gearbox, and/or the like. For case of description, each machine rotor 104 of FIG. 2 is described below as being coupled to and rotatable with a unique one of the engine rotating structures 70 of the turbine engine 24. However, it is contemplated multiple machine rotors may alternatively be coupled to and rotatable with a common engine rotating structure. It is also contemplated a single one of the machine rotors may be coupled to and rotatable with multiple engine rotating structures, directly or through another device such as a differential or a clutch system.

Each electric machine 100 of FIG. 2 may be configurable as an electric motor and/or an electric generator; e.g., an electric motor-generator. For example, during a motor mode of operation, a respective one of the electric machines 100 may operate as the electric motor to convert electricity received from the aircraft electrical system 98 into mechanical power. The machine stator 106, for example, may generate an electromagnetic field with the machine rotor 104 using a current of electricity received from the aircraft electrical system 98 through the respective EM controller 102. This electromagnetic field may drive rotation of the machine rotor 104. The machine rotor 104, in turn, may provide mechanical power to and drive rotation of the respective engine rotating structure 70 through the respective drivetrain 110. This mechanical power may be provided to boost power or completely power the rotation of the respective engine rotating structure 70. By contrast, during a generator mode of operation, the respective electric machine 100 may operate as the electric generator to convert mechanical power received from the respective engine rotating structure 70 into electricity. Rotation of the machine rotor 104, for example, may be rotationally driven by rotation of the respective engine rotating structure 70 through the respective drivetrain 110. The rotation of the machine rotor 104 may generate an electromagnetic field with the machine stator 106, and the machine stator 106 may convert energy from the electromagnetic field into electricity. The respective electric machine 100 may then provide a current of electricity to the aircraft electrical system 98 through the respective EM controller 102 for storage and/or further use. The electric machines 100 of the present disclosure, however, are not limited to such exemplary operation. For example, one, some or all of the electric machines 100 may alternatively each be configured as a dedicated electric generator; e.g., without the electric motor functionality. In another example, one, some or all of the electric machines 100 may alternatively each be configured as a dedicated electric motor; e.g., without the electric generator functionality.

Each EM controller 102A, 102B includes a controller housing 112A, 112B (generally referred to as "112") and internal controller circuitry 114A, 114B (generally referred to as "114"). The controller housing 112 may be configured as an enclosed case (e.g., a closed or sealed container) for the respective controller circuitry 114. The controller circuitry 114 is disposed within an interior of the controller housing 112; e.g., an internal chamber or other volume(s) within and enclosed by the controller housing 112. The controller circuitry 114 includes various electrical components, connectors and the like. Examples of the electrical components include, but are not limited to, printed circuit board(s) (PCB(s)), electrical inductor(s), electrical inverter(s), electrical amplifier(s), electrical switch(es) (e.g., contactor(s), relay(s), etc.), processing device(s), memory module(s), communication module(s), electrical transformer(s), electrical rectifier(s), and/or the like.

Each EM controller 102A, 102B is electrically coupled to a respective one of the electric machines 100A, 100B through one or more electric cables 116A, 116B (generally referred to as "116"); e.g., high voltage electric cables, power feeder cables, etc. More particularly, the controller circuitry 114 of each EM controller 102 is electrically coupled to the respective electric machine 100 and its machine stator 106 through the respective electric cables 116. Similarly, each EM controller 102A, 102B is electrically coupled to an electrical distribution bus 118 of the aircraft electrical system 98 through one or more electric cables 120A, 120B (generally referred to as "120"); e.g., high voltage electric cables, power feeder cables, etc. More particularly, the controller circuitry 114 of each EM controller 102 is electrically coupled to the aircraft electrical system 98 and its electrical distribution bus 118 through the respective electric cables 120.

Each EM controller 102 and its controller circuitry 114 are configured to control operation of a respective one of the electric machines 100. For example, when operating as the electric motor, the respective EM controller 102 and its controller circuitry 114 are configured to regulate a flow of electricity from the aircraft electrical system 98 to the respective electric machine 100. This electricity flow regulation may include: (a) turning-on the flow of electricity from the aircraft electrical system 98 to the respective electric machine 100 (e.g., electrically coupling the respective electric machine 100 to the aircraft electrical system 98); (b) turning-off the flow of electricity from the aircraft electrical system 98 to the respective electric machine 100 (e.g., electrically decoupling the respective electric machine 100 from the aircraft electrical system 98); (c) moderating the flow of electricity from the aircraft electrical system 98 to the respective electric machine 100. Here, the respective EM controller 102 operates as a motor controller. In another example, when operating as the electric generator, the respective EM controller 102 and its controller circuitry 114 are configured to regulate a flow of electricity from the respective electric machine 100 to the aircraft electrical system 98. This electricity flow regulation may include: (a) turning-on the flow of electricity from the respective electric machine 100 to the aircraft electrical system 98 (e.g., electrically coupling the respective electric machine 100 to the aircraft electrical system 98); (b) turning-off the flow of electricity from the respective electric machine 100 to the aircraft electrical system 98 (e.g., electrically decoupling the respective electric machine 100 from the aircraft electrical system 98); (c) moderating the flow of electricity from the respective electric machine 100 to the aircraft electrical system 98. Here, the respective EM controller 102 operates as a generator controller.

The aircraft electrical system 98 includes the electrical distribution bus 118. This aircraft electrical system 98 may also include a power source 126 and/or a power storage 128. The electrical distribution bus 118 is electrically coupled to each of the electric machines 100 through their respective EM controllers 102. The electrical distribution bus 118 is also electrically coupled to the power source 126 and the power storage 128, schematically shown via lines 130 and 132 respectively. With this arrangement, the electrical distribution bus 118 provides an intermediate connection between the various electrical aircraft propulsion system members 100A (via 102A), 100B (via 102B), 126 and/or 128. The power source 126 may be an electric generator powered by the turbine engine 24 or an electric generator powered by another aircraft powerplant; e.g., an engine of a companion aircraft propulsion system, an engine of an auxiliary power unit (APU), a fuel cell system, etc. The power storage 128 is configured to receive electricity from the electrical distribution bus 118 for storage. The power storage 128 is also configured to provide the stored electricity to the electrical distribution bus 118. The power storage 128, for example, may be configured as or otherwise include one or more electricity storage devices; e.g., batteries, super capacitors, etc.

Figure 3:
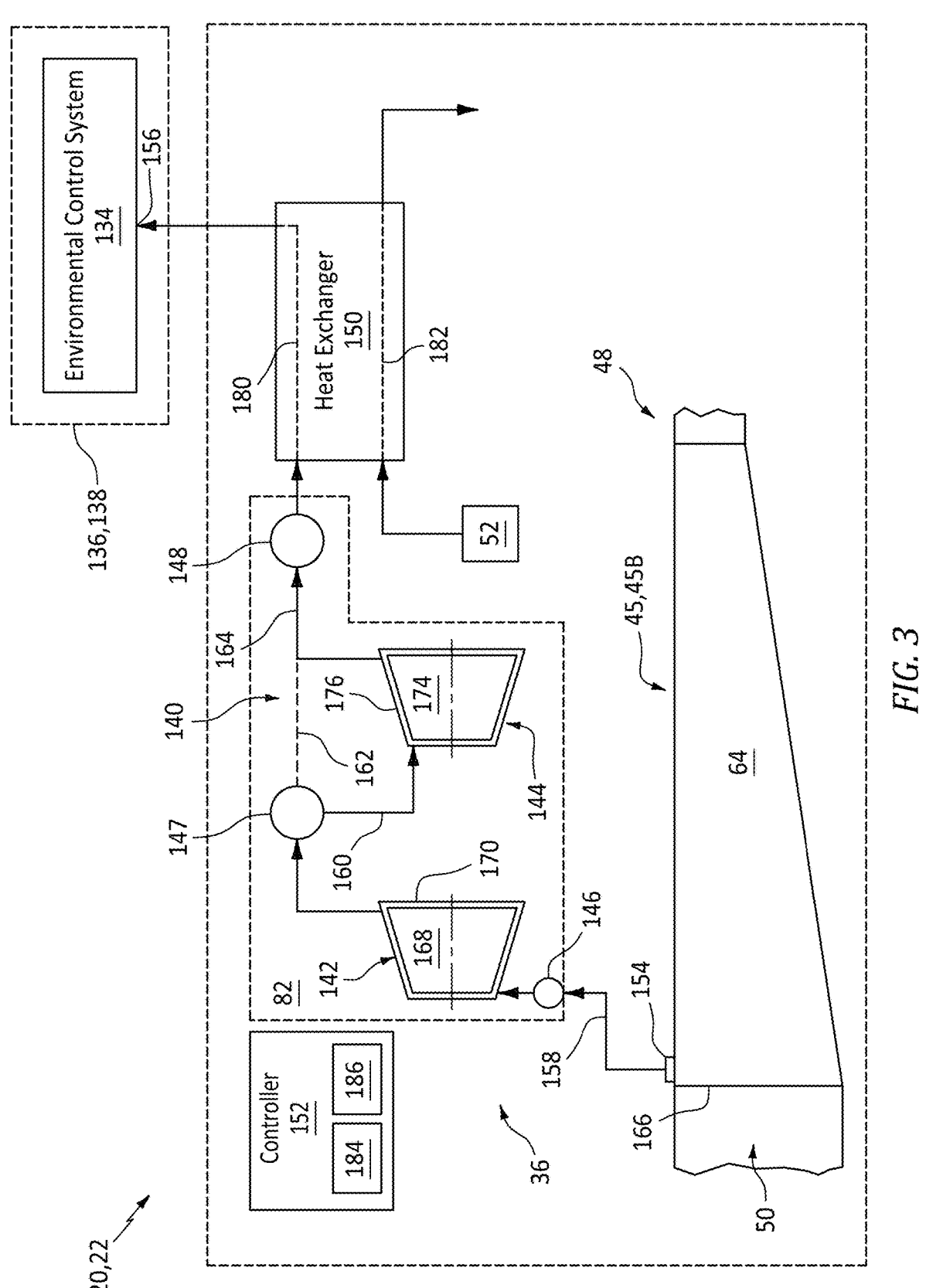
FIG. 3 is a schematic illustration of a portion of the aircraft propulsion system with an air system coupled to an environmental control system for an aircraft during a first operating mode.
Figure 4:
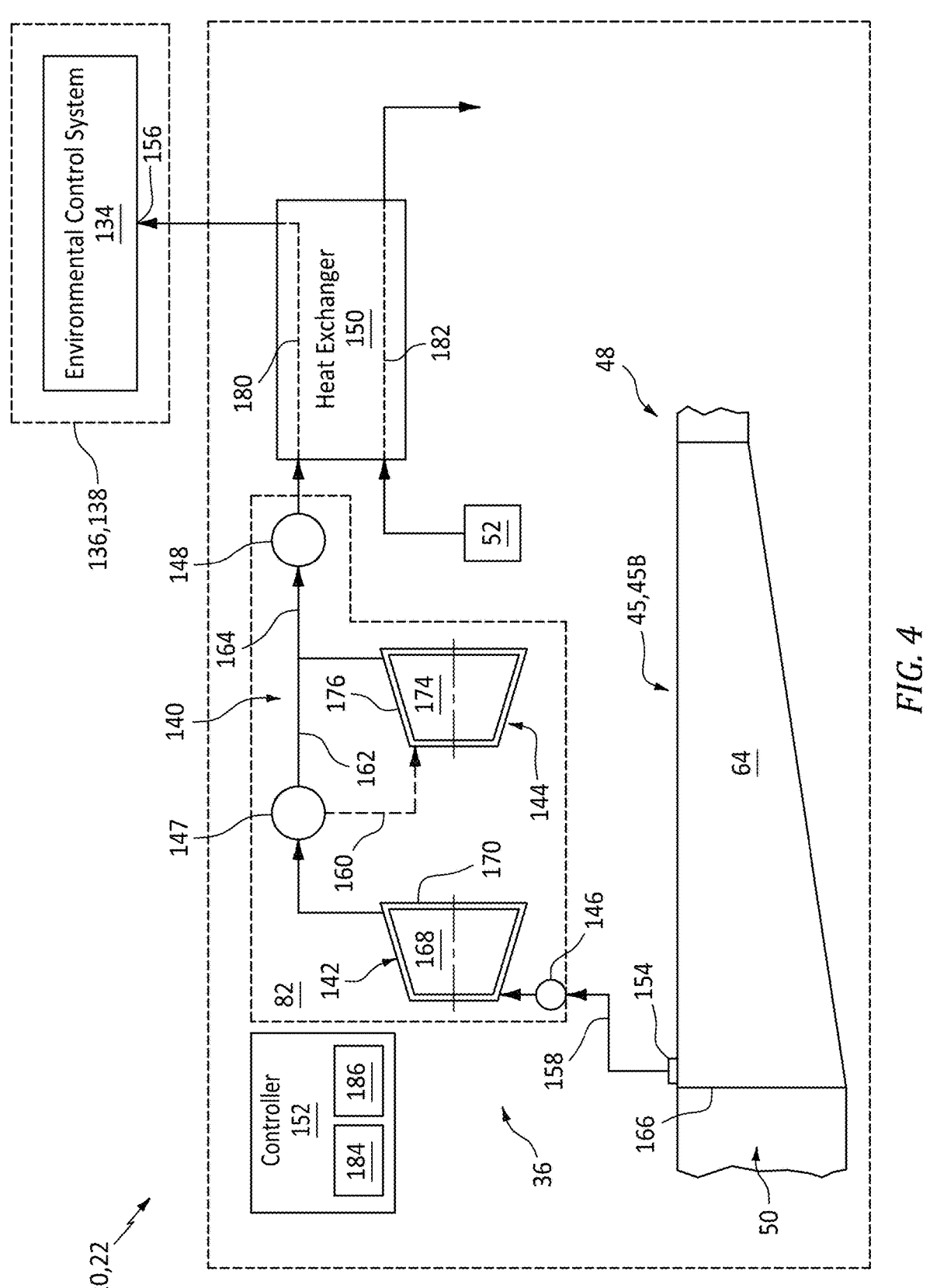
FIG. 4 is a schematic illustration of a portion of the aircraft propulsion system with the air system coupled to the environmental control system during a second operating mode.

Referring to FIGS. 3 and 4, the air system 36 is configured to provide pressurized air to an environmental control system 134 (ECS) for a cabin within a fuselage 136 of the aircraft; e.g., a cockpit, a passenger cabin, etc. This air system 36 may be dedicated to providing its pressurized air to the environmental control system 134. The present disclosure, however, is not limited to such an exemplary arrangement. The air system 36, for example, may also (or alternatively) provide the pressurized air to one or more other components and/or systems of the aircraft arranged onboard and/or part of an airframe 138 of the aircraft. The air system 36 may still also (or alternatively) provide the pressurized air to one or more components and/or systems of the aircraft propulsion system 22. Referring again to FIGS. 3 and 4, the air system 36 includes an air circuit 140 (e.g., a single or multi-path air passage), one or more boost compressors 142 and 144, one or more valves 146-148 and a heat exchanger 150. The air system 34 of FIGS. 3 and 4 also includes a controller 152.

The air circuit 140 is configured as an airflow passage fluidly coupling the core flowpath 50 to the environmental control system 134. The air circuit 140 of FIGS. 3 and 4, for example, extends longitudinally from an airflow inlet 154 into the air circuit 140 to an airflow inlet 156 into the environmental control system 134. This air circuit 140 of FIGS. 3 and 4 extends longitudinally from the circuit inlet 154, sequentially through the upstream control valve 146, through the upstream boost compressor 142, through the downstream control valve 147, (e.g., optionally) through the downstream boost compressor 144, through the over-pressure valve 148 and through the heat exchanger 150, and out of the aircraft propulsion system 22 to the environmental control system 134 and its environmental control system (ECS) inlet 156. The air circuit 140 of FIGS. 3 and 4 includes an upstream circuit leg 158, a compressor circuit leg 160, a bypass circuit leg 162 and a downstream circuit leg 164. The upstream circuit leg 158 projects longitudinally from the circuit inlet 154, sequentially through the upstream control valve 146 and the upstream boost compressor 142, to the downstream control valve 147. The compressor circuit leg 160 and the bypass circuit leg 162 are arranged fluidly in parallel between the downstream control valve 147 and an inlet into the downstream circuit leg 164. The compressor circuit leg 160 extends longitudinally through the downstream boost compressor 144, and the compressor circuit leg 160 fluidly couples the upstream circuit leg 158 (through the downstream control valve 147) to the inlet into the downstream circuit leg 164. The bypass circuit leg 162 is disposed outside of and bypasses the downstream boost compressor 144, and the bypass circuit leg 162 fluidly couples the upstream circuit leg 158 (through the downstream control valve 147) to the inlet into the downstream circuit leg 164. The downstream circuit leg 164 projects longitudinally from outlets of the parallel circuit legs 160 and 162, sequentially through the over-pressure valve 148 and the heat exchanger 150, to the environmental control system 134 and its ECS inlet 156. Of course, it is contemplated the air circuit 140 may (or may not) include one or more additional circuit legs downstream of the circuit leg 164 in FIGS. 3 and 4 for example.

The circuit inlet 154 is disposed along the core flowpath 50 upstream of the combustor section 46 and its combustor 94 (see FIG. 1). More particularly, the circuit inlet 154 is disposed along the core flowpath 50 in the compressor section 45. The circuit inlet 154 of FIGS. 3 and 4, for example, is disposed along the core flowpath 50 in the HPC section 45B. This circuit inlet 154 may be disposed along an upstream half (½), third (⅓) or quarter (¼) of the HPC rotor 64. The circuit inlet 154 of FIGS. 3 and 4, for example, is disposed at (or about) an upstream end 166 of the HPC rotor 64. The circuit inlet 154 may be configured as or otherwise include a bleed port (or multiple bleed ports) and/or a scoop (or multiple scoops) in and/or along a radial outer peripheral boundary of the core flowpath 50 longitudinally overlapping the HPC rotor 64. The present disclosure, however, is not limited to such an exemplary arrangement. For example, the circuit inlet 154 may alternatively be disposed upstream of the HPC rotor 64 along the core flowpath 50; e.g., between the LPC rotor 63 and the HPC rotor 64 of FIG. 1, or in the LPC section 45A of FIG. 1. In another example, the circuit inlet 154 may alternatively be disposed downstream of the HPC rotor 64; e.g., along a diffuser plenum surrounding the combustor 94 of FIG. 1.

The upstream boost compressor 142 is configured to boost (e.g., increase) a pressure and/or a flow rate of air flowing through the air circuit 140 and provided to the downstream environmental control system 134. The upstream boost compressor 142 of FIGS. 3 and 4, for example, includes an upstream boost compressor (UBC) rotor 168 disposed within an upstream boost compressor (UBC) housing 170; e.g., a case. The UBC rotor 168 includes a compressor base (e.g., a disk or a hub) and a plurality of compressor blades (e.g., airfoils, vanes, etc.). The compressor blades are arranged circumferentially around the compressor base in one or more annular arrays. Each of the compressor blades is connected to the compressor base. Each of the compressor blades projects spanwise (e.g., radially) out from the compressor base, into a flowpath of the upstream circuit leg 158 within the UBC housing 170, to a distal tip of the respective compressor blade.

Referring to FIGS. 5 and 6, the UBC rotor 168 may be operatively coupled to and mechanically powered by (a) the turbine engine 24 and its engine core 48 and/or (b) one of the electric machines 100. For case of description, the upstream boost compressor 142 and its UBC rotor 168 may be described below as being operatively coupled to the high speed rotating structure 70A and/or the first electric machine 100A. It is contemplated, however, the upstream boost compressor 142 and its UBC rotor 168 may alternatively be operatively coupled to the low speed rotating structure 70B and/or the second electric machine 100B (see FIGS. 1 and 2) in other embodiments. Referring still to FIGS. 5 and 6, the UBC rotor 168 may be mechanically coupled to the high speed rotating structure 70A and the first machine rotor 104A. For example, referring to FIG. 5, the first machine rotor 104A may be arranged between and mechanically coupled to the first drivetrain 110A and the UBC rotor 168. With this arrangement, the UBC rotor 168 may be rotationally driven by the high speed rotating structure 70A through the first drivetrain 110A and the first machine rotor 104A. The UBC rotor 168 may also (or alternatively) be rotationally driven by first machine rotor 104A. In some embodiments, there may be a constant coupling between the first machine rotor 104A and the UBC rotor 168. In other embodiments, a first clutch 172 may be arranged between and operatively coupled to the first machine rotor 104A and the UBC rotor 168. In such embodiments, the first clutch 172 may be disengaged such that the first machine rotor 104A may rotate without driving the rotation of the UBC rotor 168; e.g., when boost is not needed from the upstream boost compressor 142. In another example, referring to FIG. 6, the UBC rotor 168 may be arranged between and mechanically coupled to the first drivetrain 110A and the first machine rotor 104A.

Referring to FIG. 3, the downstream boost compressor 144 is configured to further boost (e.g., increase) the pressure and/or the flow rate of air flowing through the air circuit 140 and provided to the downstream environmental control system 134. The downstream boost compressor 144 of FIG. 3, for example, includes a downstream boost compressor (DBC) rotor 174 disposed within a downstream boost compressor (DBC) housing 176; e.g., a case. The DBC rotor 174 includes a compressor base (e.g., a disk or a hub) and a plurality of compressor blades (e.g., airfoils, vanes, etc.). The compressor blades are arranged circumferentially around the compressor base in one or more annular arrays. Each of the compressor blades is connected to the compressor base. Each of the compressor blades projects spanwise (e.g., radially) out from the compressor base, into a flowpath of the compressor circuit leg 160 within the DBC housing 176, to a distal tip of the respective compressor blade.

Figures 7, 8:
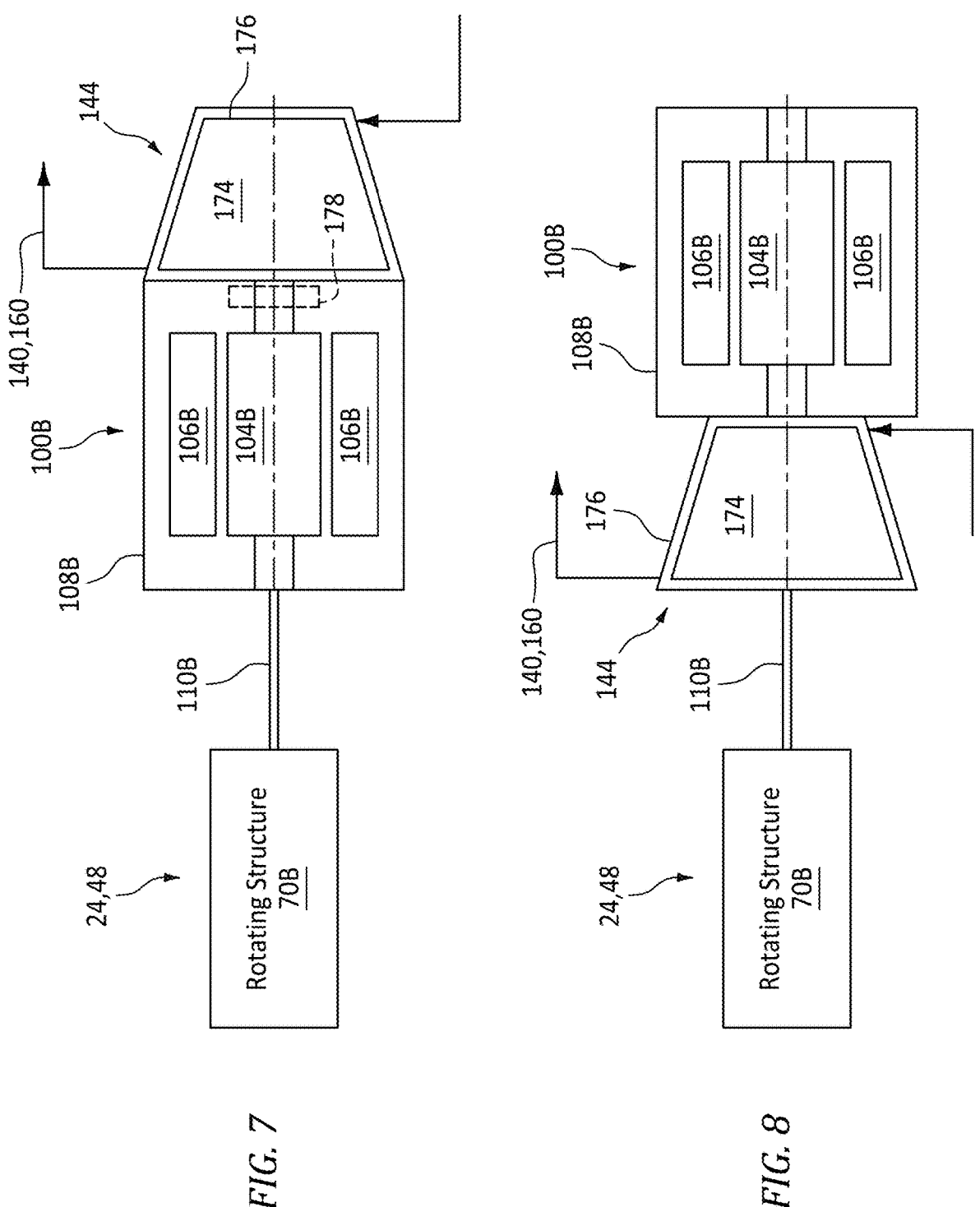
FIGS. 7 and 8 are schematic illustrations of a portion of the aircraft propulsion system with various downstream boost compressor arrangements.

Referring to FIGS. 7 and 8, the DBC rotor 174 may be operatively coupled to and mechanically powered by (a) the turbine engine 24 and its engine core 48 and/or (b) one of the electric machines 100. For ease of description, the downstream boost compressor 144 and its DBC rotor 174 may be described below as being operatively coupled to the low speed rotating structure 70B and/or the second electric machine 100B. It is contemplated, however, the downstream boost compressor 144 and its DBC rotor 174 may alternatively be operatively coupled to the high speed rotating structure 70A and/or the first electric machine 100A (see FIGS. 1 and 2) in other embodiments. Referring still to FIGS. 7 and 8, the DBC rotor 174 may be mechanically coupled to the low speed rotating structure 70B and the second machine rotor 104B. For example, referring to FIG. 7, the second machine rotor 104B may be arranged between and mechanically coupled to the second drivetrain 110B and the DBC rotor 174. With this arrangement, the DBC rotor 174 may be rotationally driven by the low speed rotating structure 70B through the second drivetrain 110B and the second machine rotor 104B. The DBC rotor 174 may also (or alternatively) be rotationally driven by the second machine rotor 104B. In some embodiments, there may be a constant coupling between the second machine rotor 104B and the DBC rotor 174. In other embodiments, a second clutch 178 may be arranged between and operatively coupled to the second machine rotor 104B and the DBC rotor 174. In such embodiments, the second clutch 178 may be disengaged such that the second machine rotor 104B may rotate without driving the rotation of the DBC rotor 174; e.g., when boost is not needed from the downstream boost compressor 144. In another example, referring to FIG. 8, the DBC rotor 174 may be arranged between and mechanically coupled to the second drivetrain 110B and the second machine rotor 104B.

The upstream control valve 146 of FIGS. 3 and 4 is configured to regulate air bled from the core flowpath 50 and directed to the upstream boost compressor 142. For example, the upstream control valve 146 may fully open such that the air bled from the core flowpath 50 through the circuit inlet 154 may flow substantially unrestricted through the upstream circuit leg 158 to the upstream boost compressor 142. In another example, the upstream control valve 146 may fully close such that no air (or only a minimum level of air bled from the core flowpath 50 through the circuit inlet 154) flows through the upstream circuit leg 158 to the upstream boost compressor 142. In still another example, the upstream control valve 146 may be partially opened (or partially closed) such that a metered flow of air bled from the core flowpath 50 through the circuit inlet 154 flows through the upstream circuit leg 158 to the upstream boost compressor 142.

The downstream control valve 147 of FIGS. 3 and 4 is configured to selectively fluidly couple the upstream circuit leg 158 and, thus, the circuit inlet 154 to the compressor circuit leg 160 and/or the bypass circuit leg 162. The downstream control valve 147, for example, may be configured as or otherwise include a switching valve or a switching valve system. Referring to FIG. 3, during a supplemental boost mode of operation, the downstream control valve 147 may fluidly couple the upstream circuit leg 158 to the compressor circuit leg 160. Here, the downstream control valve 147 may also fluidly decouple the upstream circuit leg 158 from the bypass circuit leg 162. Referring to FIG. 4, during a bypass mode of operation, the downstream control valve 147 may fluidly couple the upstream circuit leg 158 to the bypass circuit leg 162. Here, the downstream control valve 147 may also fluidly decouple the upstream circuit leg 158 from the compressor circuit leg 160. Of course, it is also contemplated the downstream control valve 147 may operate in a partial boost mode of operation where the downstream control valve 147 fluidly couples the upstream circuit leg 158 to both the compressor circuit leg 160 and the bypass circuit leg 162 according to a controlled split ratio (e.g., 25:75, 50:50 or 75:25) between the compressor circuit leg 160 and the bypass circuit leg 162.

The over-pressure valve 148 of FIGS. 3 and 4 is configured to selectively dump some of the air pressurized by the HPC section 45B, the upstream boost compressor 142 and/or the downstream boost compressor 144 such that the pressurized air provided to the downstream environmental control system 134 does not rise above a certain (e.g., maximum) operative threshold. The air dumped (e.g., bled off) by the over-pressure valve 148 may be directed into the bypass flowpath 52 (see FIG. 1) or another volume within or outside of the aircraft propulsion system 22.

The heat exchanger 150 of FIGS. 3 and 4 includes a plurality of fluidly discrete internal passages 180 and 182. The air system passage 180 of FIGS. 3 and 4 is part of and is thereby fluidly coupled inline with the air circuit 140 and its downstream circuit leg 164. The cooling passage 182 of FIGS. 3 and 4 is configured to receive a cooling fluid such as, but not limited to, air bled from the bypass flowpath 52. These internal passages 180 and 182 may be arranged to provide the heat exchanger 150 with a parallel flow configuration, a cross-flow configuration, a counterflow configuration, or a hybrid configuration including any two or more of the foregoing configurations. With this arrangement, the heat exchanger 150 is configured to exchange heat energy between (a) the pressurized air flowing through the air circuit 140 and its air system passage 180 and (b) the cooling fluid (e.g., the bled bypass air) flowing through the cooling passage 182. Note, while the heat exchanger 150 is shown in FIGS. 3 and 4 with a single air system passage 180 and a single cooling passage 182 for ease of illustration, it is to be understood the heat exchanger 150 may include a network of the air system passages and/or a network of the cooling passages.

The controller 152 is configured to control operation of the air system 36. The controller 152 is in signal communication with (e.g., hardwired and/or wirelessly coupled to) the upstream control valve 146 and the downstream control valve 147. The controller 152 may be implemented with a combination of hardware and software. The hardware may include memory 184 and at least one processing device 186, which processing device 186 may include one or more single-core and/or multi-core processors. The hardware may also or alternatively include analog and/or digital circuitry other than that described above.

The memory 184 is configured to store software (e.g., program instructions) for execution by the processing device 186, which software execution may control and/or facilitate performance of one or more operations such as those described herein. The memory 184 may be a non-transitory computer readable medium. For example, the memory 184 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

The air system 36 may operate in various modes of operation including, for example, the supplemental boost mode and the bypass mode. The selection of the mode of operation may be based on an open-loop control schedule or a closed-loop control schedule. This control schedule may be tuned based on one or more aircraft parameters such as, but not limited to, aircraft altitude, aircraft speed (e.g., Mach number), internal engine temperature (e.g., in the HPC section 45B), internal flowpath pressure (e.g., in the HPC section 45B), ambient air temperature, ambient air pressure, high speed rotating structure speed, etc. The aircraft parameter(s) may be measured, derived from an onboard model, relayed from a control program and/or otherwise obtained.

Referring to FIG. 3, the air system 36 may operate in the supplemental boost mode when, for example, the controller 152 determines the operational parameter is equal to or above a threshold. Briefly, the threshold may be retrieved from a lookup table, or derived from a model or using an algorithm. During the supplemental boost mode of FIG. 3, the controller 152 signals the upstream control valve 146 to open. The controller 152 further signals the downstream control valve 147 to fluidly couple the upstream circuit leg 158 to the compressor circuit leg 160 while also fluidly decoupling the upstream circuit leg 158 from the bypass circuit leg 162. With this arrangement, the upstream boost compressor 142 (when engaged) and the downstream boost compressor 144 sequentially compress the air bled from the core flowpath 50 for provision to the environmental control system 134.

Referring to FIG. 4, the air system 36 may operate in the bypass mode when, for example, the controller 152 determines the operational parameter is below the threshold. During the bypass mode of FIG. 4, the controller 152 signals the upstream control valve 146 to open (or partially close). The controller 152 further signals the downstream control valve 147 to fluidly couple the upstream circuit leg 158 to the bypass circuit leg 162 while also fluidly decoupling the upstream circuit leg 158 from the compressor circuit leg 160. With this arrangement, the upstream boost compressor 142 (when engaged) is the only compressor compressing the air bled from the core flowpath 50 for provision to the environmental control system 134.

While operation of the air system 36 is described above with respect to the supplemental boost mode and the bypass mode, it is contemplated the air system 36 may (or may not) also be operated in an intermediate mode; e.g., one or more partial boost modes. During these partial boost modes, the downstream control valve 147 may be controlled to direct air from the upstream circuit leg 158 into both the compressor circuit leg 160 and the bypass circuit leg 162.

Figures 9, 10:
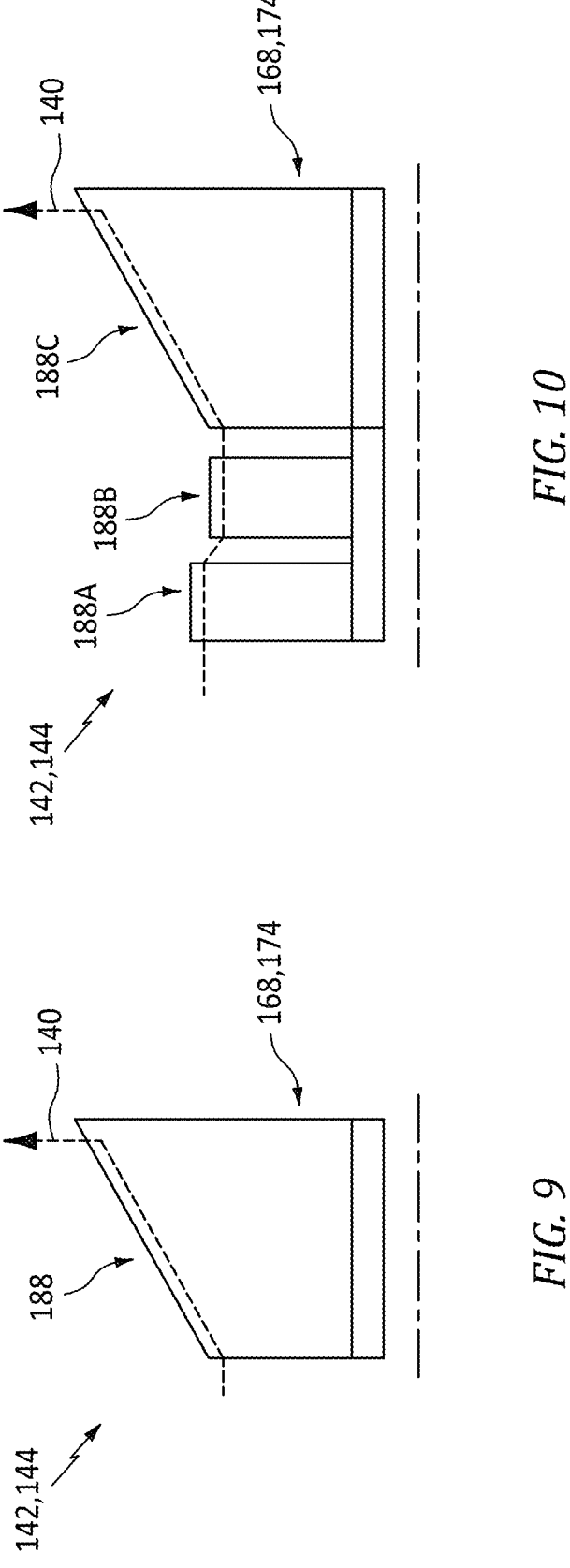
FIGS. 9 and 10 are partial schematic illustrations of various boost compressor rotor arrangements.

In some embodiments, referring to FIG. 9, one or more of the compressor rotors 168, 174 may each be configured with a single stage 188 (e.g., a single array) of its compressor blades. The compressor rotor 168, 174 of FIG. 9 may be configured as a radial flow compressor. In other embodiments, referring to FIG. 10, one or more of the compressor rotors 168, 174 may each be configured with multiple stages 188A-C of its compressor blades. The upstream stages 188A and 188B of FIG. 10 are each configured as axial flow compressor stages. The downstream stage 188C of FIG. 10 is configured as a radial flow compressor stage. The present disclosure, however, is not limited to such exemplary compressor rotor arrangements.

In some embodiments, referring to FIG. 1, the heat exchanger 150 may be configured in a vane structure 190 extending radially across the bypass flowpath 52. This vane structure 190 may be configured as a bifurcation (e.g., an upper bifurcation or a lower bifurcation) that circumferentially bifurcates a longitudinal section of the bypass flowpath 52. Of course, it is contemplated the heat exchanger 150 may alternatively be located elsewhere within the aircraft propulsion system 22 or even offboard of the aircraft propulsion system 22; e.g., within a pylon structure mounting the aircraft propulsion system 22 to the aircraft airframe 138.

In some embodiments, the heat exchanger 150 of FIGS. 3 and 4 may be configured as an air-to-air heat exchanger as generally described above. In such embodiments, following passage through the heat exchanger 150, the air may be directed into an internal compartment (e.g., the inner housing compartment 82 of FIG. 1), an internal flowpath (e.g., the bypass flowpath 52 of FIG. 1) and/or any other internal volume of the aircraft propulsion system 22. Alternatively, the air may be directed into the external environment 88 (see FIG. 1) or another volume outside of the aircraft propulsion system 22. In other embodiments, however, it is contemplated the heat exchanger 150 may alternatively be configured as a liquid-to-air heat exchanger where, for example, the cooling fluid is coolant, lubricant, fuel, hydraulic fluid and/or another liquid working fluid utilized within the aircraft propulsion system 22 and/or otherwise onboard the aircraft.

In some embodiments, referring to FIGS. 5 and 7, each boost compressor 142, 144 may be configured as a line replaceable unit (LRU). Each boost compressor 142, 144, for example, may be detachable from the respective electric machine 100 as a single complete unit. Alternatively, each boost compressor 142, 144 and its associated electric machine 100 (see also FIGS. 6 and 8) may be configured as the line replaceable unit. Each boost compressor 142, 144 and the respective electric machine 100 may be configured together in a module which may be detachable from the respective drivetrain 110 as a single complete unit.

The aircraft propulsion system 22 of FIG. 1 is described above as a ducted propulsor propulsion system; e.g., the turbofan propulsion system. The present disclosure, however, is not limited to such an exemplary aircraft propulsion system. For example, referring to FIG. 11, the outer housing structure 30 (see FIG. 1) may be omitted from the housing structure 26 to open the propulsor rotor 62 up to the external environment 88. More particularly, the propulsor rotor 62 of FIG. 11 includes a plurality of open propulsor blades 192 arranged circumferentially about the propulsion system axis 38 in an array; e.g., a circular array. This array of the propulsor blades 192 may be unshrouded or alternatively shrouded by a tubular propulsor rotor shroud dedicated to the propulsor rotor 62 for example. Each of these propulsor blades 192 projects spanwise (e.g., radially) out from a base of the propulsor rotor 62, into the external environment 88, to a distal tip 194 of the respective propulsor blade 192. Each propulsor blade 192 is thereby configured as an un-ducted propulsor blade which is exposed to (e.g., disposed in) the surrounding external environment 88. With this arrangement, the propulsor rotor 62 is an open propulsor rotor (e.g., an un-ducted propulsor rotor) and the aircraft propulsion system 22 is configured as an open rotor propulsion system. Moreover, the inner housing structure 28 and its nacelle structure 80 may form an exterior of the aircraft propulsion system 22 and may border the external environment 88.

The guide vane structure 32 may also be open to the external environment 88 forming an open guide vane structure. This guide vane structure 32 of FIG. 11 includes a plurality of open exit guide vanes 196; e.g., airfoils. The guide vanes 196 are arranged and may (or may not) be equispaced circumferentially about the propulsion system axis 38 in an array; e.g., a circular array. This array of the guide vanes 196 may be unshrouded or alternatively shrouded by a tubular guide vane shroud dedicated to the guide vane structure 32 for example. This guide vane structure 32 and its guide vanes 196 are arranged axially next to (e.g., adjacent) the propulsor rotor 62 and its propulsor blades 192. The guide vane structure 32 and its guide vanes 196 of FIG. 11, for example, are arranged downstream of the propulsor rotor 62 and its propulsor blades 192, without (e.g., any) other elements axially therebetween to obstruct, turn and/or otherwise influence the air propelled by the propulsor rotor 62 to the guide vane structure 32. Each of the guide vanes 196 projects radially out from an exterior surface of the inner housing structure 28, into the external environment 88, to a distal tip 198 of the respective guide vane 196. Each guide vane 196 is thereby configured as an un-ducted guide vane which is exposed to (e.g., disposed in) the surrounding external environment 88. With the foregoing arrangement, the guide vane structure 32 and its guide vanes 196 are configured to condition (e.g., straighten out, de-swirl, etc.) an outer stream of air propelled by the propulsor rotor 62 within the external environment 88 that bypass the engine core 48. Of course, in other embodiments, the guide vane structure 32 may be omitted where, for example, the aircraft propulsion system 22 is alternatively configured as a counter-rotating open rotor (CROR) aircraft propulsion system, etc.

Figure 11:
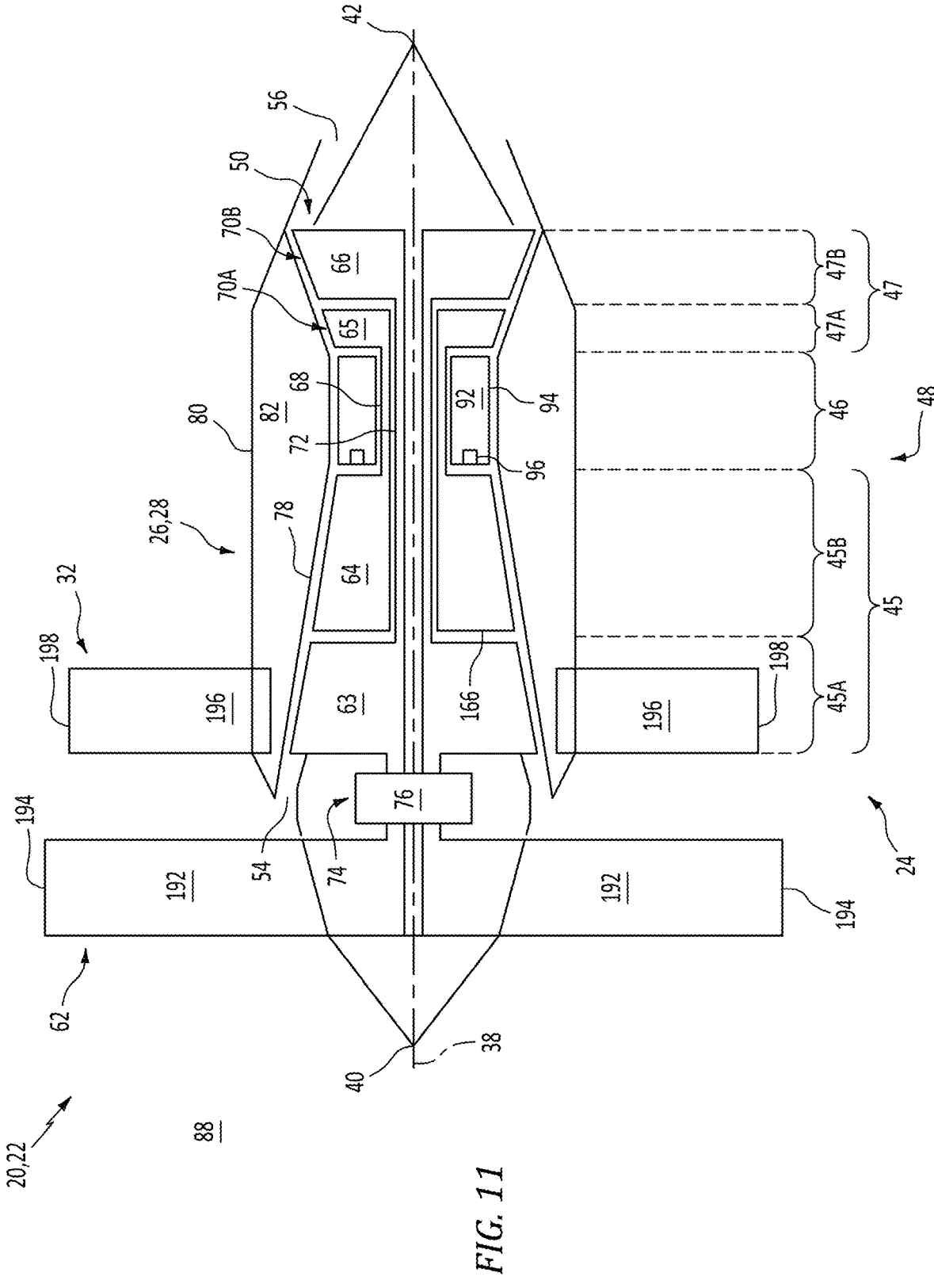
FIG. 11 is a partial schematic illustration of the aircraft propulsion system with an open propulsor rotor.

While the turbine engine 24 in FIG. 1 and FIG. 11 is shown with a particular two rotating structure arrangement, the present disclosure is not limited thereto. For example, the LPC rotor 63 may be omitted to configure the LPT rotor 66 as a power turbine (PT) rotor for the propulsor rotor 62. In another example, the turbine engine 24 may also include another rotating structure; e.g., an intermediate speed spool for the turbine engine 24 and its engine core 48.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure.

Accordingly, the present disclosure is not to be restricted except in light of the attached claims and their equivalents.

What is claimed is:

1. A system for an aircraft, comprising:

a turbine engine including a flowpath, a compressor section, a combustor section and a turbine section, the flowpath extending through the compressor section, the combustor section and the turbine section from an airflow inlet into the flowpath to a combustion products exhaust from the flowpath;

an air system including an air circuit, a first boost compressor, a second boost compressor and a heat exchanger, a circuit inlet into the air circuit fluidly coupled to the flowpath upstream of the combustor section, and the air circuit projecting out from the circuit inlet and extending through the first boost compressor, the second boost compressor and the heat exchanger;

a first electric machine comprising a first electric machine rotor, the first boost compressor comprising a first boost compressor rotor, and the first electric machine rotor mechanically coupled to and configured to drive rotation of the first boost compressor rotor; and a second electric machine comprising a second electric machine rotor, the second boost compressor comprising a second boost compressor rotor, and the second electric machine rotor mechanically coupled to and configured to drive rotation of the second boost compressor rotor.

2. The system of claim 1, further comprising an environmental control system for the aircraft, the air circuit extending from the circuit inlet to an airflow inlet into the environmental control system.

3. The system of claim 1, wherein the turbine engine further includes a first rotating structure and a second rotating structure;

the first rotating structure comprises a first bladed rotor in the compressor section or the turbine section, and the first rotating structure is mechanically coupled to and configured to drive rotation of the first boost compressor rotor; and the second rotating structure is rotationally independent of the first rotating structure, the second rotating structure comprises a second bladed rotor in the compressor section or the turbine section, and the second rotating structure is mechanically coupled to and configured to drive rotation of the second boost compressor rotor.

4. The system of claim 1, further comprising a clutch mechanically coupling a rotating structure of the turbine engine to the one of the first boost compressor rotor or the second boost compressor rotor.

5. The system of claim 1, wherein the air system further includes a valve fluidly coupled inline along the air circuit between the circuit inlet and the first boost compressor.

6. The system of claim 1, wherein the air system further includes a valve fluidly coupled inline along the air circuit between the second boost compressor and the heat exchanger.

7. The system of claim 1, wherein the turbine engine further includes a first rotating structure and a second rotating structure that is rotationally independent of the first rotating structure;

the first rotating structure comprises a first compressor rotor in the compressor section;

the second rotating structure comprises a second compressor rotor in the compressor section, and the second compressor rotor is disposed between the first compressor rotor and a combustor in the combustor section; and the circuit inlet is fluidly coupled to the flowpath downstream of the first compressor rotor.

8. The system of claim 7, wherein the circuit inlet is fluidly coupled to the flowpath along the second compressor rotor.

9. The system of claim 1, further comprising:

a ducted propulsor rotor;

the turbine engine configured to drive rotation of the ducted propulsor rotor.

10. The system of claim 1, further comprising:

an open propulsor rotor;

the turbine engine configured to drive rotation of the open propulsor rotor.

11. A system for an aircraft, comprising:

a turbine engine including a flowpath, a compressor section, a combustor section and a turbine section, the flowpath extending through the compressor section, the combustor section and the turbine section from an airflow inlet into the flowpath to a combustion products exhaust from the flowpath;

an air system including an air circuit, a first boost compressor, a second boost compressor and a heat exchanger, a circuit inlet into the air circuit fluidly coupled to the flowpath upstream of the combustor section, and the air circuit projecting out from the circuit inlet and extending through the first boost compressor, the second boost compressor and the heat exchanger;

wherein the first boost compressor and the second boost compressor are mechanically powered by the turbine engine.

12. A system for an aircraft, comprising:

a turbine engine including a flowpath, a compressor section, a combustor section and a turbine section, the flowpath extending through the compressor section, the combustor section and the turbine section from an airflow inlet into the flowpath to a combustion products exhaust from the flowpath; and an air system including an air circuit, a first boost compressor, a second boost compressor and a heat exchanger, a circuit inlet into the air circuit fluidly coupled to the flowpath upstream of the combustor section, and the air circuit projecting out from the circuit inlet and extending through the first boost compressor, the second boost compressor and the heat exchanger, wherein the air circuit includes a first circuit leg extending through the first boost compressor;

a second circuit leg extending through the heat exchanger; and a plurality of parallel circuit legs disposed between and fluidly coupled with the first circuit leg and the second circuit leg, a first of the plurality of parallel circuit legs extending through the second boost compressor, and a second of the plurality of parallel circuit legs bypassing the second boost compressor.

13. The system of claim 12, wherein the air circuit further includes a valve configured to fluidly couple the first circuit leg to the first of the plurality of parallel circuit legs during a first mode; and fluidly couple the second circuit leg to the second of the plurality of parallel circuit legs during a second mode.

14. The system of claim 13, wherein the valve is further configured to at least one of fluidly decouple the first circuit leg from the second of the plurality of parallel circuit legs during the first mode; or fluidly decouple the first circuit leg from the first of the plurality of parallel circuit legs during the second mode.

15. A system for an aircraft, comprising:

a turbine engine including a flowpath, a first rotating structure, a compressor section, a combustor section and a turbine section, the flowpath extending through the compressor section, the combustor section and the turbine section from an airflow inlet into the flowpath to a combustion products exhaust from the flowpath, and the first rotating structure comprising a first bladed rotor in the compressor section or the turbine section;

an air system including an air circuit, a first boost compressor and a heat exchanger, a circuit inlet into the air circuit fluidly coupled to the flowpath upstream of the combustor section, the air circuit projecting out from the circuit inlet and extending through the first boost compressor and the heat exchanger, and the first boost compressor comprising a first boost compressor rotor; and a first electric machine comprising a first electric machine rotor, the first electric machine rotor operably coupled to and between the first rotating structure and the first boost compressor rotor.

16. A system for an aircraft, comprising:

a turbine engine including a flowpath, a first rotating structure, a compressor section, a combustor section and a turbine section, the flowpath extending through the compressor section, the combustor section and the turbine section from an airflow inlet into the flowpath to a combustion products exhaust from the flowpath, and the first rotating structure comprising a first bladed rotor in the compressor section or the turbine section;

an air system including an air circuit, a first boost compressor and a heat exchanger, a circuit inlet into the air circuit fluidly coupled to the flowpath upstream of the combustor section, the air circuit projecting out from the circuit inlet and extending through the first boost compressor and the heat exchanger, and the first boost compressor comprising a first boost compressor rotor; and a first electric machine comprising a first electric machine rotor;

the first boost compressor rotor operably coupled to and between the first rotating structure and the first electric machine rotor.

* * * * *